(12) United States Patent
Groen et al.

(10) Patent No.: US 10,773,974 B2
(45) Date of Patent: Sep. 15, 2020

(54) COMPACT FLOATATION UNIT

(71) Applicant: FMC Separation Systems, BV, Amsterdam (NL)

(72) Inventors: Corné Groen, Arnhem (NL); Govert Kruijtzer, Arnhem (NL)

(73) Assignee: FMC Separation Systems, BV, Amsterdam (NL)

( * ) Notice: Subject to any disclaimer, the term of this patent is extended or adjusted under 35 U.S.C. 154(b) by 350 days.

(21) Appl. No.: 15/565,159

(22) PCT Filed: Apr. 8, 2015

(86) PCT No.: PCT/EP2015/057608
§ 371 (c)(1),
(2) Date: Oct. 7, 2017

(87) PCT Pub. No.: WO2016/162060
PCT Pub. Date: Oct. 13, 2016

(65) Prior Publication Data
US 2018/0111848 A1  Apr. 26, 2018

(51) Int. Cl.
*C02F 1/24* (2006.01)
*B03D 1/14* (2006.01)
(Continued)

(52) U.S. Cl.
CPC ............ *C02F 1/24* (2013.01); *B01D 17/0205* (2013.01); *B03D 1/1431* (2013.01);
(Continued)

(58) Field of Classification Search
CPC ................. C02F 1/24; C02F 2201/002; C02F 2103/365; C02F 2301/026; B03D 1/1431; B03D 1/1418; B01D 17/0205
(Continued)

(56) References Cited

U.S. PATENT DOCUMENTS 3,479,281 A * 11/1969 Kikindai et al. ..... B03D 1/1437
                                                210/703
4,094,783 A    6/1978  Jackson
(Continued)

FOREIGN PATENT DOCUMENTS

DE       19845536 A1 * 10/1999
DE       198 31 530 C1   3/2000
(Continued)

*Primary Examiner* — Thomas M Lithgow (57) ABSTRACT

The present invention provides a method of purifying a contaminated liquid flow (A) comprising the steps of: introducing a first type of gas bubbles (8) in the contaminated liquid flow (A), the first type of gas bubbles obtained by at least partly saturating a liquid with a first gas (B'), at a first pressure, followed by a lowering of the first pressure to a second pressure; introducing a second type of gas bubbles (9) to the contaminated liquid flow (A) downstream of the introduction of the first type of gas bubbles, the second type of gas bubbles formed by sparging, entrainment or attrition of a second gas (B''); extracting a reject stream (C) comprising aggregates formed by the interaction of contaminants from the contaminated liquid flow (A) with both the first and the second type of gas bubbles; and obtaining a purified liquid flow (D) downstream of the introduction of the second type of gas bubbles; as well as a system and a vessel for use in such a method.

10 Claims, 3 Drawing Sheets

(51) Int. Cl.
*B01D 17/02* (2006.01)
*C02F 103/36* (2006.01)

(52) U.S. Cl.
CPC ...... *B03D 1/1418* (2013.01); *C02F 2103/365* (2013.01); *C02F 2201/002* (2013.01); *C02F 2301/026* (2013.01)

(58) Field of Classification Search
USPC .............................................. 210/703, 221.2
See application file for complete search history.

(56) References Cited

U.S. PATENT DOCUMENTS

| | | | |
|---|---|---|---|
| 5,552,051 A | 9/1996 | Wang et al. | |
| 5,650,044 A * | 7/1997 | Serres | D21B 1/325 162/4 |
| 5,702,612 A | 12/1997 | Wang | |
| 8,734,577 B2 * | 5/2014 | Naess | B01D 17/0211 96/174 |
| 2008/0029459 A1 | 2/2008 | Yamasaki et al. | |
| 2012/0111436 A1 | 5/2012 | Matsufuji et al. | |

FOREIGN PATENT DOCUMENTS

| | | |
|---|---|---|
| DE | 199 53 961 A1 | 5/2001 |
| GB | 2 409 677 A | 7/2005 |
| WO | WO 2009/087921 A1 | 7/2009 |
| WO | WO 2012/065250 A1 | 5/2012 |

\* cited by examiner

COMPACT FLOATATION UNIT

FIELD OF THE INVENTION

The present invention relates to the field of liquid purification, and more particularly to a method, a system and a vessel for purification of liquid by floatation.

BACKGROUND

In oil and gas producing facilities, a large amount of oil contaminated liquids is produced. Such liquids include for instance produced or processed water containing oil residues and solids, and they are commonly purified by use of systems including compact floatation units (CFUs).

In compact floatation units (CFUs), purification of the contaminated liquid is obtained by bringing the liquid into contact with gas bubbles. The gas bubbles attach to oil droplets in the liquid creating agglomerates having a density lower than the density of the oil droplets.

In prior art CFU systems, the gas bubbles are commonly obtained by either dissolved air floatation (DAF) or induced gas floatation (IGF), or a combination wherein the gas bubbles formed by DAF is due to residual gas in the liquid to be purified.

The purpose of the present invention is to provide an improved compact floatation unit.

SUMMARY OF THE INVENTION

The present invention provides an improved method of purifying a contaminated liquid, a system suitable for such a method, and a vessel suitable for use in such a system. The invention is defined by the appended claims and in the following:

In a first aspect, the present invention provides a method of purifying a contaminated liquid flow comprising the steps of:
a. introducing a first type of gas bubbles in the contaminated liquid flow, the first type of gas bubbles obtained by at least partly saturating a liquid with a first gas, at a first pressure, followed by a lowering of the first pressure to a second pressure;
b. introducing a second type of gas bubbles to the contaminated liquid flow downstream of the introduction of the first type of gas bubbles, the second type of gas bubbles formed by sparging, entrainment or attrition of a second gas;
c. extracting a reject stream comprising aggregates formed by the interaction of contaminants from the contaminated liquid flow with both the first and the second type of gas bubbles; and
d. obtaining a purified liquid flow downstream of the introduction of the second type of gas bubbles.

In one embodiment of the method according to the invention, the liquid being saturated in step a) is at least a portion of the contaminated liquid flow.

In one embodiment of the method according to the invention, the liquid being saturated in step a) is at least a part of the purified liquid flow obtained in step d). The part of the purified liquid flow being saturated in step a) is recirculated and/or introduced into the contaminated liquid flow, upstream of the introduction of the second type of gas bubbles. In other words, the liquid being saturated in step a) is a recirculated part of the purified liquid flow obtained in step d).

In one embodiment of the method according to the invention, the second type of gas bubbles is formed by mixing the second gas with a part of the purified liquid flow. The part of the purified liquid flow being mixed with the second gas is recirculated and/or introduced upstream of the extraction of the reject stream, or downstream of the introduction of the first type of gas bubbles. The mixing may be obtained by various means known to the skilled person, for instance by use of an eductor. The size of the part recycled from the obtained purified liquid flow may vary depending on the level of initial contamination and/or the required purification level. During normal operations, the recycled purified liquid flow is about 5-25% of the contaminated liquid flow.

In one embodiment of the method according to the invention, the reject stream of step c) is extracted downstream of the formation of the aggregates. More specifically, the reject stream is extracted after the interaction of the contaminated liquid flow with both the first and the second types of gas bubbles, forming said aggregates, and the extraction may therefore be considered as occurring downstream said formation. The reject stream is extracted at the point in the process where the reject stream may comprise aggregates formed by contaminant (for instance oil) and both the first and second types of gas bubbles. The reject stream will commonly also comprise aggregates formed by contaminant and the first type of gas bubbles, and contaminant and the second type of gas bubbles.

In one embodiment of the method according to the invention, the method comprises an initial step of:
providing a vessel comprising a cylindrical wall, a first inlet for the contaminated liquid flow, a second inlet for the second gas, a first outlet for a reject stream, and a second outlet for obtaining the purified liquid flow.

In one embodiment of the method according to the invention, the first inlet of the vessel is arranged in an upper half of the vessel, the second inlet is arranged to provide the second gas to a distributor unit arranged in a lower half of the vessel, the second outlet is arranged in the lower half of the vessel below, or at the same height of, the distributor unit, and the first outlet is arranged in the upper half of the vessel above the first inlet.

In one embodiment of the method according to the invention, the vessel comprises a gas saturation device for at least partly saturating the contaminated liquid flow, or a recycled part of the purified liquid flow, with the first gas at a first pressure. The gas saturation device is arranged upstream of the first inlet.

In one embodiment of the method according to the invention, the vessel comprises at least a first vessel stage and a second vessel stage. The first vessel stage is preferably arranged above the second vessel stage and comprises the first inlet, and the second vessel stage comprises the second outlet and the distributor unit. Each of the first and second vessel stages comprises a first outlet for a reject stream, and the first and second vessel stages are fluidly connected by a conduit extending between a connecting outlet arranged in a lower half of the first vessel stage and a connecting inlet of the second vessel stage. The vessel may also comprise at least one intermediate vessel stage arranged between the first vessel stage and the second vessel stage. In those cases, the intermediate vessel stage is considered as being part of the conduit fluidly connecting the first vessel stage and the second vessel stage. The intermediate vessel stage will preferably comprise a first outlet for a reject stream.

In one embodiment of the method according to the invention, the method provides first and second types of gas bubbles, wherein the ratio between the linear mean diameter of the second type of gas bubbles and the linear mean diameter of the first type of gas bubbles is at least 2, at least 5 or at least 10.

In one embodiment of the method according to the invention, the method provides first and second types of gas bubbles, wherein the first type of gas bubbles has a linear mean diameter in the range of 10 to 60 μm, and the second type of gas bubbles has a linear mean diameter >100 μm.

In a second aspect, the present invention provides a liquid purification system for the method according to the invention, comprising a gas saturation unit, preferably having an inlet for a first gas, and a vessel, the vessel having a cylindrical wall, a first inlet for a contaminated liquid flow, a second inlet for a second gas, a first outlet for a reject stream comprising contaminants from the contaminated liquid, and a second outlet for a purified liquid flow, wherein
the first inlet is arranged in an upper half of the vessel;
the second outlet is arranged in a lower half of the vessel;
the first outlet is arranged in the upper half of the vessel, above the first inlet; and
the second inlet is arranged to provide the second gas to a distributor unit during use, and the distributor unit is arranged in the lower half of the vessel above or at the same height of the first outlet; and
the gas saturation unit is arranged upstream of the first inlet and is configured such that at least parts of the contaminated liquid flow, or a recirculated part of the purified liquid flow, may be at least partly saturated with the first gas at a first pressure during use, prior to entering the upper half of the vessel.

In an embodiment of the liquid purification system according to the invention, said system comprises an eductor fluidly connected to the second outlet, the second inlet and a gas source for the second gas, and the eductor is configured such that a part of the purified liquid flow may be mixed with the second gas from the gas source prior to being introduced to the vessel via the second inlet during use.

In a further embodiment of the liquid purification system according to the invention a pressure lowering device is arranged in or downstream of the gas saturation unit, such that the pressure of the saturated part of the contaminated liquid, and/or the part of the purified liquid flow, is lowered before or upon entering the vessel during use. Such devices, for instance a choke valve, are well known to the skilled person.

In a further embodiment of the liquid purification system according to the invention the second outlet is fluidly connected to the gas saturation unit by a conduit. The connection between the second outlet and the gas saturation unit is configured such that at least a part of a purified liquid flow may be recirculated from the second outlet to the gas saturation unit during use.

In a further embodiment of the liquid purification system according to the invention the vessel comprises at least a first vessel stage and a second vessel stage. The first vessel stage is preferably arranged above the second vessel stage and comprises the first inlet, and the second vessel stage comprises the second outlet and the distributor unit. Each of the first and second vessel stages comprises a first outlet for a reject stream, and the first and second vessel stages are fluidly connected by a conduit extending between a connecting outlet arranged in a lower half of the first vessel stage and a connecting inlet of the second vessel stage. The vessel may also comprise at least one intermediate vessel stage arranged between the first vessel stage and the second vessel stage. In those cases, the intermediate vessel stage is considered as being part of the conduit fluidly connecting the first vessel stage and the second vessel stage. The intermediate vessel stage will preferably comprise a first outlet for a reject stream.

In one embodiment of the liquid purification system according to the invention, the system is able to provide first and second types of gas bubbles, wherein the ratio between the linear mean diameter of the second type of gas bubbles and the linear mean diameter of the first type of gas bubbles is at least 2, at least 5 or at least 10.

In one embodiment of the liquid purification system according to the invention, the system is able to provide first and second types of gas bubbles, wherein the first type of gas bubbles has a linear mean diameter in the range of 10 to 60 μm, and the second type of gas bubbles has a linear mean diameter >100 μm.

In a third aspect, the present invention provides a vessel for use in a method and/or a liquid purification system according to the invention. The vessel comprises a cylindrical wall, a first inlet, a second inlet, a first outlet, and a second outlet. The first inlet is arranged in an upper half of the vessel, the second inlet is fluidly connected by a conduit to a distributor unit arranged in a lower half of the vessel, the second outlet is arranged in the lower half of the vessel, and the first outlet is arranged in the upper half of the vessel above the first inlet. The vessel comprises an internal sleeve having a frusto-conical shape with an upper end and a lower end. The upper end has a diameter which is smaller than the diameter of the lower end, and the diameter of the lower end is smaller than the diameter of the circular wall such that a flow area is provided between the circular wall and the lower end, the lower end being arranged above the distribution unit. The first inlet is for a contaminated liquid flow, the second inlet is for a gas, the second outlet is for a purified liquid and the first outlet is for a reject stream.

In an embodiment of the liquid purification system or the vessel according to the invention, the first inlet of the vessel is arranged below the upper end of the internal sleeve and above the lower end of the internal sleeve. The first inlet is preferably arranged such that the initial direction of an inlet flow entering the vessel will not intersect the centerline of the vessel.

In an embodiment of the liquid purification system or the vessel according to the invention, the first inlet of the vessel is arranged such that a flow of contaminated liquid will enter the vessel in a direction being substantially tangential to the cylindrical wall at the point of entry of the flow.

In an embodiment of the method, the liquid purification system, and/or the vessel according to the invention, the distribution unit comprises a pipe having at least one radial perforation. In it simplest form, the distribution unit may only comprise a single pipe, or conduit, fluidly connected to the second inlet. In further embodiments, the distribution unit may comprise for instance a frit or a pipe having multiple longitudinally spaced perforations. The distribution unit may be configured to provide gas bubbles centrally within the vessel. The distribution unit may have a configuration where the pipe has a fan shaped outlet section, or one or more circular outlet sections with distributed openings.

In an embodiment of the invention, the purified liquid flow is water and the contaminants comprise oil. The method, system and vessel of the invention are especially suitable for use in relation to oil and gas production facilities, especially for cleaning produced water, flowback water and coil tube water. Further areas of use include purification of contaminated fluids produced or obtained in the mining industry, the paper industry and similar.

The size and size ratio of the gas bubbles used in the method according to the invention may preferably be measured by means of various optical sensors.

More particularly, the specific linear mean diameter of a type of gas bubbles is measured by use of the method disclosed by Moruzzi et al., Characterization of micro-bubble size distribution and flow configuration in DAF contact zone by a non-intrusive image analysis system and tracer tests, Water Science & Technology, 61.1, 2010. The ratio between the linear mean diameter of two types (or populations) of gas bubbles may be measured by any suitable method, as the value of the ratio is independent of the choice of method.

In the present specification the term "at least partly saturated" is intended to mean that the amount of gas dissolved in a liquid is increased compared to the amount naturally present in the liquid before being at least partly saturated.

In the present specification, the first inlet is defined as being arranged in an upper half of the vessel, the second outlet as being arranged in a lower half of the vessel, and the first outlet as being arranged in the upper half of the vessel, above the first inlet. The term "being arranged in" is intended to define at which point a liquid or gas flow passing through an inlet/outlet enters or exits the internal volume of the vessel. For instance, the reject stream extracted through the first outlet may pass through the wall of the vessel at any suitable point, for example via a conduit, as long as the first outlet is arranged such that the reject stream is extracted from the upper half of the internal volume of the vessel.

The present description refers to both a first and a second gas. The first and second gas is are commonly of the same type, for instance nitrogen, and may also originate from the same gas source.

DETAILED DESCRIPTION OF EMBODIMENTS OF THE INVENTION

The present disclosure provides an improved method for purification of a contaminated liquid. The inventive method is based on a combination of two well known principles for the purification of liquids by floatation, i.e. dissolved air (or gas) floatation (DAF or DGF) and induced gas floatation (IGF). The two principles are different in the way that the required gas bubbles are formed, and in the size of the generated gas bubbles.

In DAF/DGF systems, the liquid to be purified, or a liquid to be combined with the liquid to be purified, is at least partly saturated with a suitable gas at a first pressure. When the first pressure is subsequently lowered to a second pressure, the liquid becomes oversaturated by the gas and gas bubbles are thus formed. The linear mean diameter of gas bubbles obtained in DAF systems is commonly in the range of 10 to 60 µm.

In IGF systems, the gas bubbles are formed by introduction of the gas into the liquid to be purified by sparging, entrainment and/or attrition, i.e. the gas bubbles are not formed due to oversaturation of the liquid, but by being mixed into the liquid by use of, for example, an eductor (entrainment), a frit (sparging) or an impeller (attrition/entrainment), ref. D. J. Wedlock, Controlled Particle, Droplet and Bubble Formation (Colloid and Surface Engineering Series), Butterworth-Heinemann Ltd. The linear mean diameter of gas bubbles obtained in IGF systems is commonly above 100 µm.

The linear mean diameter of gas bubbles, or the size ratio between two types of gas bubbles, may be measured by optical methods, preferably the method disclosed by Moruzzi et al., Characterization of micro-bubble size distribution and flow configuration in DAF contact zone by a non-intrusive image analysis system and tracer tests, Water Science & Technology, 61.1, 2010.

The method according to the invention is described in detail by reference to the system shown in FIG. 1. The system comprises a vessel 1 having a cylindrical wall 2, a first inlet 3, a second inlet 4, a first outlet 6 and a second outlet 5. In use, a liquid to be purified (i.e. in this particular case; oil contaminated water) is at least partly saturated with a suitable gas (for instance nitrogen or air) by the gas saturation unit 10. The gas saturation occurs at a first pressure. The gas saturation unit may be any suitable unit/apparatus able to at least partly saturate a liquid with a gas, for instance a unit comprising a pressure drum 30 and a source of compressed gas B', see FIG. 4. In this particular embodiment, the gas saturation is obtained by first saturating a portion of purified liquid D recycled from the second outlet 5 with a first gas B', and then mixing the contaminated liquid with said portion of gas saturated purified liquid. Following gas saturation, the contaminated liquid enters the vessel through the first inlet 3. The pressure of the contaminated liquid is lowered to a second pressure upon (or immediately before) entering the vessel 1. The second pressure is sufficiently low as to cause gas oversaturation of the contaminated liquid. The gas oversaturation leads to the formation of a first type of gas bubbles 8 according to the principle used in DAF/DGF systems.

Alternatively, and in many cases preferably, the formation of the first type of gas bubbles may occur in the gas saturated portion of purified liquid D before mixing with the contaminated liquid. The final result will in any case be the presence of the first type of gas bubbles in the contaminated liquid upon entering the first inlet 3.

Figure 4:
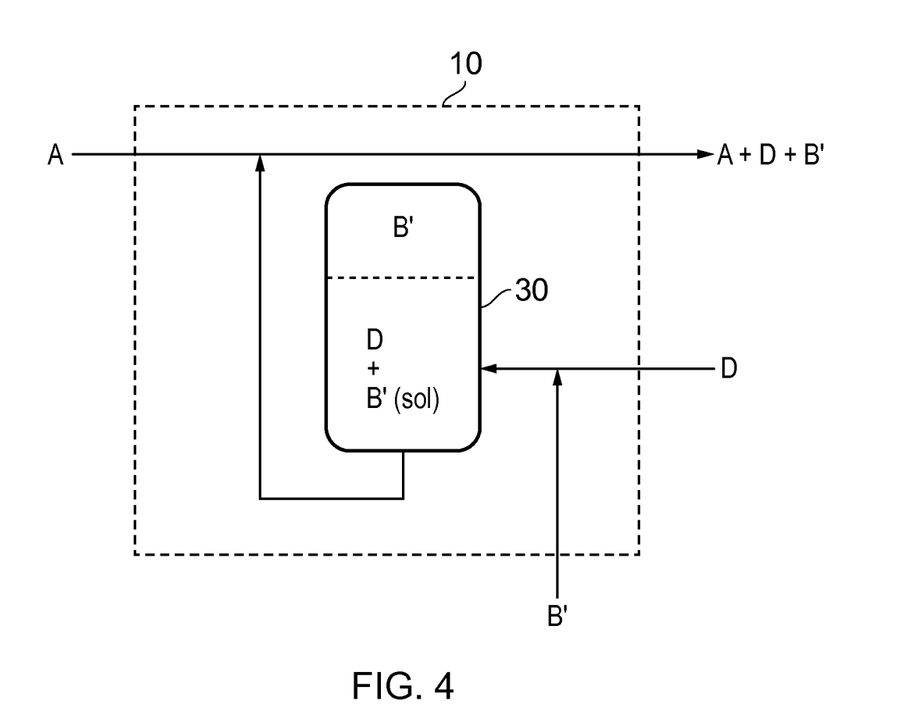
FIG. 4 is a schematic drawing of a gas saturation unit for use in the present invention.

The gas saturation unit 10 in FIG. 4 is shown to saturate a portion of purified liquid D with a first gas B' before being mixed with the contaminated liquid A. In other embodiments, the portion of purified liquid D may be replaced by at least a fraction of the contaminated liquid A.

Figure 3:
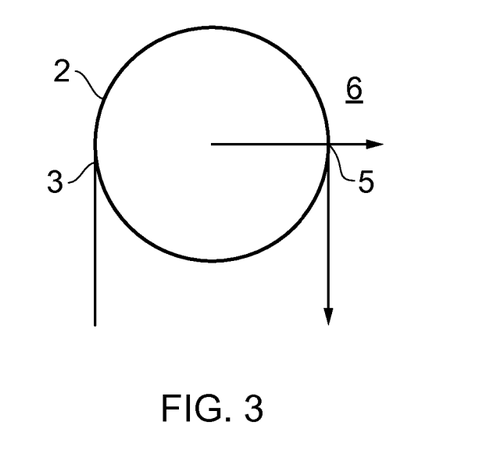
FIG. 3 is a schematic drawing of a possible inlet/outlet arrangement in a system or vessel according to the invention.

The first inlet 3 is preferably arranged such that a flow of contaminated liquid A will enter the vessel 1 in a direction substantially tangential to the cylindrical wall 2 at the point of entry, see FIG. 3. The tangential direction provides a contaminated liquid flow having a swirl movement along the cylindrical wall. Small oil droplets present in the contaminated liquid flow are mixed with the first type of gas bubbles (also referred to as small gas bubbles, preferably having a linear mean diameter in the range of 10 to 60 µm) and optionally any required chemicals. The oil droplets and the small gas bubbles form agglomerates which may move upwards and towards the axial center of the vessel due to the centripetal force caused by the swirl movement and the density of the agglomerates. The rising agglomerates may be skimmed off at the liquid interface in an upper part of the vessel and removed from the system through the first outlet 6 (i.e. as a reject stream C). However, within the flow of contaminated liquid, the small bubbles and potentially their agglomerates with the oil droplets may also follow the flow to the second outlet 5 for purified liquid. This undesired effect may occur due to insufficient retention time of the contaminated liquid in the vessel and/or an axial velocity of the flow of contaminated liquid being too high for the small bubbles to overcome and migrate to the liquid interface. The inability of the small bubbles to overcome the axial velocity of the liquid flow is in part due to their low terminal velocity, which is small due to the small diameter of the bubbles.

To counteract the tendency of the small gas bubbles, and/or the agglomerates formed between the small gas bubbles and the oil droplets, to follow the liquid flow to the second outlet 5 for purified liquid, a second type of gas bubbles (also referred to as large gas bubbles, preferably having a linear mean diameter of more than 100 μm) is introduced into the vessel via a distribution unit 7 arranged in a lower half of the vessel. Large gas bubbles will have a higher terminal velocity than small gas bubbles. The large bubbles are formed as described above for IGF systems. In addition to distributing the introduced large gas bubbles over a wide area, ensuring optimum interaction with the agglomerates formed between the small gas bubbles and the oil droplets, the distribution unit may itself be the device which cause the gas bubble formation (i.e. the distribution unit may comprise a frit or similar device). In the specific embodiment of FIG. 1, the distribution unit comprises a perforated tube, and the large gas bubbles are formed by mixing a gas B" with a liquid E in an eductor 12. The liquid E, comprising the large gas bubbles 9, is introduced to the vessel via the perforated tube of the distribution unit 7. In a preferred embodiment, the liquid E is a portion of recycled purified liquid from the second outlet 5. By introducing the large gas bubbles in a lower half, or bottom, of the vessel, they are able to sweep the whole volume of the vessel before arriving at the liquid interface.

When rising upwards in the vessel, the large gas bubbles will collide with the agglomerates formed by the small gas bubbles and the oil droplets. Said agglomerates are entrapped by/attached to the large gas bubbles and will migrate along with said gas bubbles towards the liquid interface instead of potentially exiting through the second outlet 5.

To achieve a desired purification result, intensive mixing of the oil droplets and the small gas bubbles is required. However, high velocity gradients may break up the formed agglomerates, decreasing the effective separation of the oil droplets from the contaminated liquid. In the system of FIG. 1, the vessel is equipped with an internal sleeve 11 for providing an enhanced liquid flow pattern and velocity gradient within the vessel. Although the internal sleeve provides a number of advantages, it is not an essential feature when combined with the method or system according to the invention. The internal sleeve has a conical hollow shape with a flat top (i.e. frusto-conical). The end of the internal sleeve having the smallest diameter is directed upwards in the vessel, i.e. the upper end 14, while the end of the internal sleeve having the largest diameter is directed downwards in the vessel, i.e. the lower end 15. Due to the shape of the internal sleeve, the contaminated liquid is kept longer in the upper half of the vessel since the flow area is decreasing in the downwards direction (the gap 19 between the circular wall and the surface of the internal sleeve decreases in the downwards direction within the vessel). The effect of the internal sleeve is an improved mixing of the oil droplets and the small gas bubbles in an upper region 16 of the vessel (i.e. the volume defined in the horizontal region between the circular wall of the vessel and the internal sleeve), while at the same time avoiding high velocity gradients which may break up the formed agglomerates in the lower region 17 of the vessel (i.e. the volume of the vessel below the internal sleeve) and in the internal volume 18 of the internal sleeve. The cross-sectional area of the inner sleeve (i.e. of the cross-section transverse to the centerline of the inner sleeve) decreases in the direction towards the first outlet 6. This provides a further advantage of the internal sleeve in that the formed agglomerates are concentrated at the upper end of the internal sleeve, thus facilitating their removal through the first outlet 6.

The height of the internal sleeve is about half the vertical distance between the first inlet 3 and the second outlet 5. The upper end of the internal sleeve is further arranged above the first inlet 3 and the lower end of the internal sleeve is arranged below the first inlet 3. Preferably, the first inlet is arranged below the upper end of the internal sleeve at a vertical distance from the upper end of about ⅓ to ⅔ of the total height of the internal sleeve.

Figure 1:
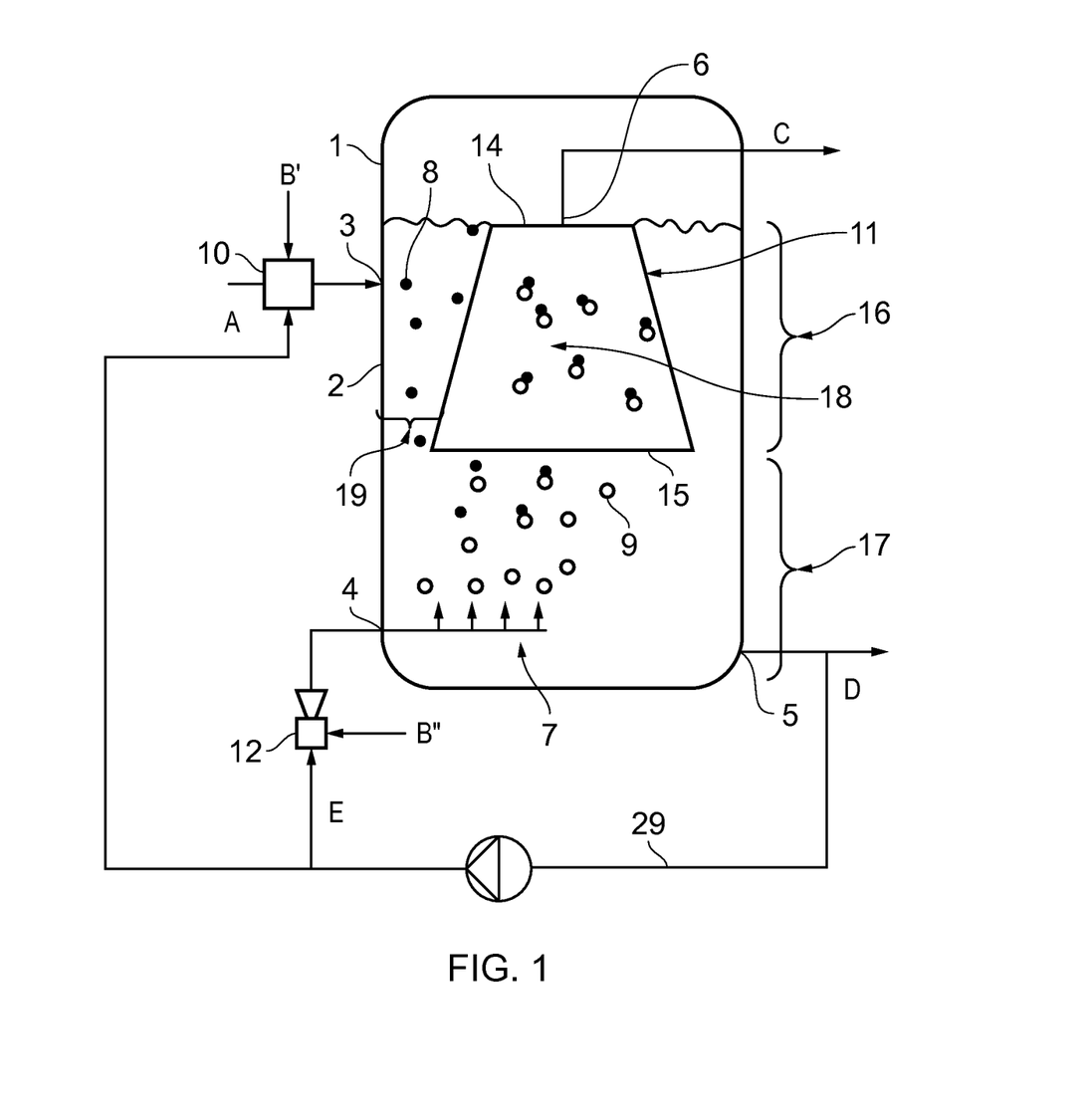
FIG. 1 is a schematic drawing of an embodiment of a liquid purification system according to the invention.
Figure 2:
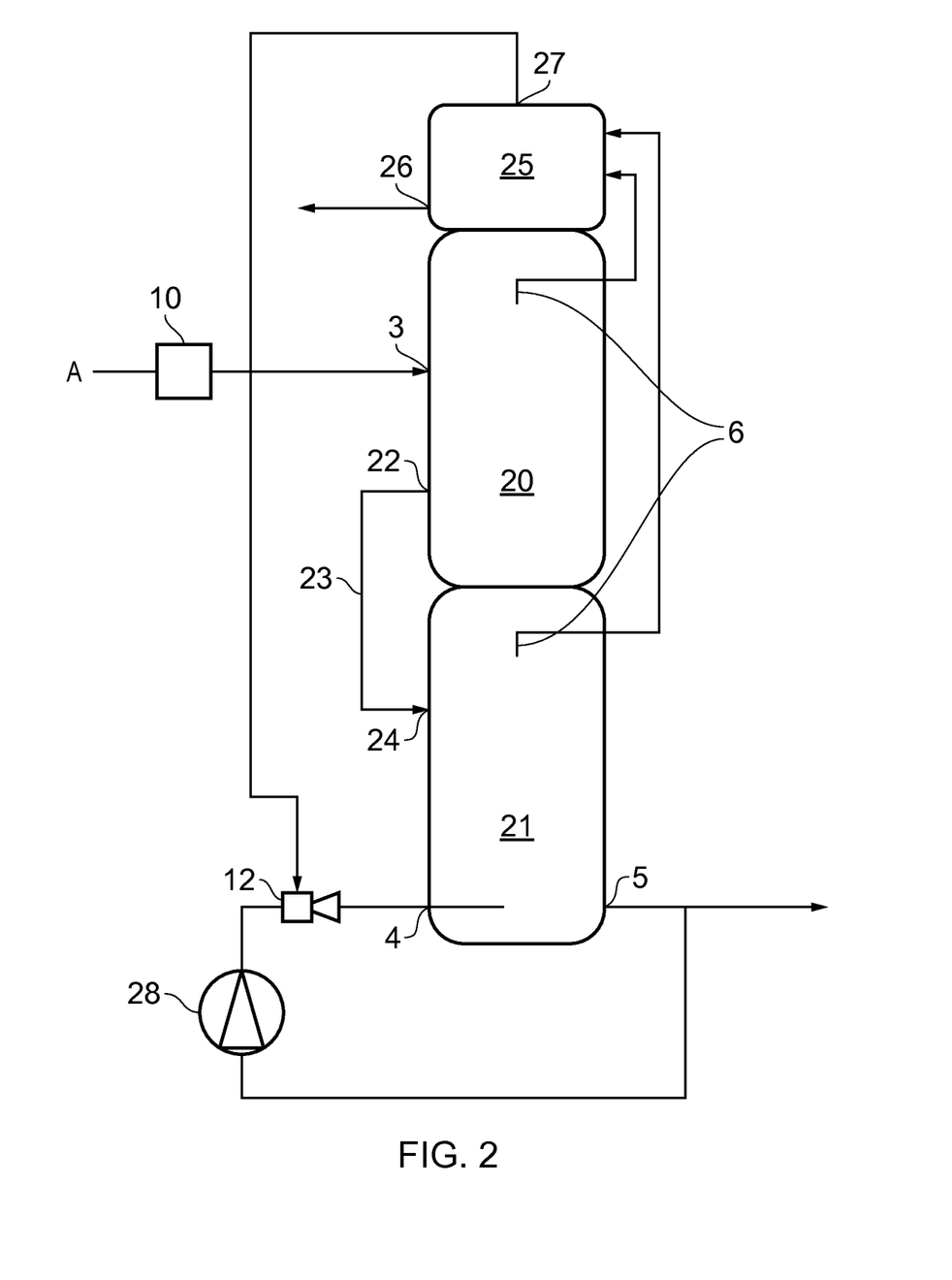
FIG. 2 is a schematic drawing of a further embodiment of a system according to the invention.

An alternative system for use with the method according to the invention is shown in FIG. 2. In this system, the vessel comprises a first stage vessel 20 and a second stage vessel 21. Similar to the system of FIG. 1, the vessel comprises a first inlet 3 for a contaminated fluid A. To provide the small gas bubbles, the contaminated fluid is at least partly saturated by a gas before entering the first stage of the vessel, as described above in connection with the system of FIG. 1. An intermediate outlet 22 is arranged in the lower half of the first stage vessel 20 and is fluidly connected by a conduit 23 to an intermediate inlet 24 in the upper half of the second stage vessel 21. Both the first stage vessel 20 and the second stage vessel 21 have a first outlet 6 for a reject stream comprising contaminants from the contaminated liquid. The first outlets 6 are fluidly connected by conduits to a reject tank 25. In the reject tank, the reject stream is separated into a contaminant phase (comprising for instance oil and water) and a gas phase. The contaminant phase is discarded through a contaminant outlet 26, and the gas phase is led through a gas outlet 27. The gas exiting the gas outlet 27 is recycled to a second inlet 4 in the second stage vessel 21 via an eductor 12. By use of the reject tank 25, allowing for recycling of the gas, the required amount of gas added to the system is kept to a minimum. In the eductor 12, the recycled gas from the reject tank 25 is mixed with some of the purified liquid exiting the second outlet 5 to provide large gas bubbles. The purified liquid recycled to the eductor is pressurized by a pump 28.

The reject tank 25 described in connection with the system of FIG. 2 may advantageously be used in combination with any type of prior art system for purification of liquids by floatation when said prior art system provides a reject stream comprising gas.

A further advantageous feature of the systems in FIGS. 1 and 2 is the provision of the first outlet 6 through the side wall of the first stage vessel and the second stage vessel (i.e. of the vessel). This feature is made possible by having the first outlet 6 fluidly connected to the reject phase (the agglomerates concentrated at the upper liquid interface) in the upper half of the vessel by an angled conduit. The feature facilitates, or even allows for, the stacking of multiple vessel stages or vessels on top of each other. Thus, said feature allows the construction of compact systems comprising multiple vessels.

The concept of having the first outlet 6 arranged through the side wall of the vessel is advantageously combined with having the outlets/inlets (for instance the first inlet 3 and the second outlet 5) arranged in a direction tangential to the circular wall of the vessel as shown in FIG. 3. The tangential arrangement of the inlets/outlets allows for compact stacking of multiple vessels in a horizontal plane. Thus, vessels featuring a combination of the first outlet 6 arranged through the side wall of the vessel, and at least one of the further required outlets/inlets arranged in a direction tangential to the circular wall of the vessel (the second outlet 5 may for instance be arranged radially without compromising the compact stacking), allows for both horizontal and vertical stacking of multiple vessels, while at the same time having access to the piping outside of the vessels. The construction of purification systems having multiple treatment stages is greatly facilitated by the disclosed arrangement of the inlets/outlets.

The invention claimed is:

1. A liquid purification system for a method for purifying a contaminated liquid flow (A), the method comprising the steps of (a) introducing a first type of gas bubbles (8) into the contaminated liquid flow (A), the first type of gas bubbles being obtained by at least partly saturating a liquid with a first gas (B') at a first pressure, followed by lowering the first pressure to a second pressure; (b) introducing a second type of gas bubbles (9) into the contaminated liquid flow (A) downstream of the introduction of the first type of gas bubbles, the second type of gas bubbles being formed by sparging, entrainment or attrition of a second gas (B") with the contaminated liquid flow; (c) extracting a reject stream (C) comprising aggregates formed by the interaction of contaminants from the contaminated liquid flow with both the first type and the second type of gas bubbles; and (d) obtaining a purified liquid flow (D) downstream of the introduction of the second type of gas bubbles, the liquid purification system comprising:
   a gas saturation unit (10);
   a vessel (1) having a cylindrical wall (2), a first inlet (3) for the contaminated liquid flow (A), a second inlet (4) for the second gas (B"), a first outlet (6) for the reject stream (C), and a second outlet (5) for the purified liquid flow (D); and
   a distribution unit (7) which is connected to the second inlet (4) and is located in a lower half of the vessel at a position at least as high as the second outlet;
   wherein the first inlet (3) is arranged in an upper half of the vessel, the first outlet (6) is arranged in the upper half of the vessel above the first inlet (3), and the second outlet (5) is arranged in the lower half of the vessel; and
   wherein the gas saturation unit (10) has an inlet for the first gas (B') and is arranged upstream of the first inlet (3) such that at least a part of the contaminated liquid flow (A), and/or a recirculated part of the purified liquid flow (D), is at least partly saturated with the first gas (B') at a first pressure prior to entering the upper half of the vessel.

2. The liquid purification system according to claim 1, further comprising an eductor (12) which is fluidly connected to the second outlet (5), the second inlet (4) and a gas source for the second gas (B"), wherein a fraction of the purified liquid flow (D) may be mixed with a second gas (B") from the gas source prior to being introduced to the vessel (1) via the second inlet (4) during use.

3. The liquid purification system according to claim 1, further comprising a pressure lowering device which is arranged in or downstream of the gas saturation unit such that the pressure of the at least partly saturated part of the contaminated liquid flow (A), and/or the at least partly saturated recirculated part of the purified liquid flow (D), is lowered before or upon entering the vessel during use.

4. The liquid purification system according to claim 1, wherein the second outlet (5) is fluidly connected to the gas saturation unit (10) by a conduit (29).

5. The liquid purification system according to any of claims 1-4, wherein the vessel comprises a first vessel stage (20) and a second vessel stage (21), the first vessel stage being arranged above the second vessel stage and comprising the first inlet (3), and the second vessel stage comprising the second outlet (5) and the distributor unit (7), wherein each of the first and second vessel stage comprises a first outlet (6) for a reject stream, and wherein the first and second vessel stages are fluidly connected by a conduit (23) extending between a connecting outlet (22) arranged in a lower half of the first vessel stage and a connecting inlet (24) of the second vessel stage.

6. A vessel (1) for use in a method for purifying a contaminated liquid flow (A), the method comprising the steps of (a) introducing a first type of gas bubbles (8) into the contaminated liquid flow (A), the first type of gas bubbles being obtained by at least partly saturating a liquid with a first gas (B') at a first pressure, followed by lowering the first pressure to a second pressure; (b) introducing a second type of gas bubbles (9) into the contaminated liquid flow (A) downstream of the introduction of the first type of pas bubbles, the second type of gas bubbles being formed by sparging, entrainment or attrition of a second gas (B") with the contaminated liquid flow; (c) extracting a reject stream (C) comprising aggregates formed by the interaction of contaminants from the contaminated liquid flow with both the first type and the second type of gas bubbles; and (d) obtaining a purified liquid flow (D) downstream of the introduction of the second type of gas bubbles, the vessel comprising:
   a cylindrical wall (2);
   a first inlet (3) for the contaminated liquid flow, the first inlet being arranged in an upper half of the vessel;
   a second inlet (4) for the second gas, the second inlet being fluidly connected by a conduit to a distributor distribution unit (7) arranged in a lower half of the vessel;
   a first outlet (6) for the reject stream, the first outlet being arranged in the upper half of the vessel above the first inlet; and
   a second outlet (5) for the purified liquid flow, the second outlet being arranged in the lower half of the vessel;
   wherein the vessel comprises an internal sleeve (11) having a frusto-conical shape with an upper end (14) and a lower end (15), the upper end having a diameter which is smaller than the diameter of the lower end, and the diameter of the lower end being smaller than the diameter of the circular wall (2) such that a flow area is provided between the circular wall and the lower end, the lower end (15) being arranged above the distribution unit (7).

7. The vessel according to claim 6, wherein the first inlet (3) is arranged below the upper end (14) of the internal sleeve (11) and above the lower end (15) of the internal sleeve.

8. The vessel according to claim 6, wherein the first inlet (3) is arranged such that the contaminated liquid flow will enter the vessel in a direction substantially tangential to the cylindrical wall (2).

9. The liquid purification system according to claim 1, wherein the distribution unit (7) comprises a pipe having at least one radial perforation.

10. The vessel according to claim 6, wherein the distribution unit (7) comprises a pipe having at least one radial perforation.

* * * * *